United States Patent
Zhou (10) Patent No.: US 10,438,324 B2
(45) Date of Patent: Oct. 8, 2019

(54) OPTIMIZATING METHOD, SYSTEM, AND SMART DEVICE TO DISPLAY CIRCULAR PATTERNS SMOOTHLY

(71) Applicant: HuiZhou TCL Mobile Communication Co., Ltd., HuiZhou (CN)

(72) Inventor: Libin Zhou, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 195 days.

(21) Appl. No.: 15/546,805

(22) PCT Filed: Jul. 6, 2016

(86) PCT No.: PCT/CN2016/088822
§ 371 (c)(1),
(2) Date: Jul. 27, 2017

(87) PCT Pub. No.: WO2017/088485
PCT Pub. Date: Jun. 1, 2017

(65) Prior Publication Data
US 2018/0012338 A1    Jan. 11, 2018

(30) Foreign Application Priority Data

Nov. 25, 2015   (CN) .......................... 2015 1 0828826

(51) Int. Cl.
*G06T 5/00*    (2006.01)
*G06T 11/20*   (2006.01)

(52) U.S. Cl.
CPC .............. *G06T 5/002* (2013.01); *G06T 5/006* (2013.01); *G06T 11/203* (2013.01)

(58) Field of Classification Search
CPC ........ G06T 5/002; G06T 5/006; G06T 11/203
See application file for complete search history.

(56) References Cited

U.S. PATENT DOCUMENTS

| | | | |
|---|---|---|---|
| 9,105,113 B1 * | 8/2015 | Crow | .................. G06T 19/00 |
| 2006/0256115 A1 * | 11/2006 | Cao | ..................... G06T 11/20 |
| | | | 345/442 |

(Continued)

FOREIGN PATENT DOCUMENTS

| CN | 101770637 | 7/2010 |
|---|---|---|
| CN | 103559690 | 2/2014 |

(Continued)

*Primary Examiner* — Grace Q Li (57) ABSTRACT

An optimizing method, a system, and a smart device to display circular patterns smoothly are provided by the present disclosure. It gets coordinate values of all points on the circular pattern. It calculates respective transparency compensation values of two adjacent points with respect to a corresponding one of the points to any coordinate in an X-axis direction and a Y-axis direction of the circular pattern using a maximum limit of the transparency as a benchmark, and then calculates a transparency compensation value of the corresponding one of the points using the transparency compensation values of the two adjacent points. Finally, it redraws all points of the circular pattern based on the calculated transparency compensation value and the RGB parameters of the corresponding one of the points.

13 Claims, 3 Drawing Sheets

(56) References Cited

U.S. PATENT DOCUMENTS

| | | | | |
|---|---|---|---|---|
| 2011/0243471 A1* | 10/2011 | Alshina | ............... | H04N 19/48 |
| | | | | 382/248 |
| 2013/0016244 A1* | 1/2013 | Takahashi | ............ | H04N 5/144 |
| | | | | 348/222.1 |
| 2015/0220195 A1* | 8/2015 | Jin | ..................... | G06F 1/1643 |
| | | | | 345/173 |

FOREIGN PATENT DOCUMENTS

| | | |
|---|---|---|
| CN | 103617640 | 3/2014 |
| CN | 105427258 | 3/2016 |
| WO | WO 2017/088485 | 6/2017 |

\* cited by examiner

OPTIMIZATING METHOD, SYSTEM, AND SMART DEVICE TO DISPLAY CIRCULAR PATTERNS SMOOTHLY

RELATED APPLICATIONS

This application is a National Phase of PCT Patent Application No. PCT/CN2016/088822 having International filing date of Jul. 6, 2016, which claims the benefit of priority of Chinese Patent Application No. 201510828826.1 filed on Nov. 25, 2015. The contents of the above applications are all incorporated by reference as if fully set forth herein in their entirety.

FIELD AND BACKGROUND OF THE INVENTION

The present disclosure relates to the field of display control technology, and more specifically to an optimizing method, a system, and a smart device to display circular patterns smoothly.

Figure 1:
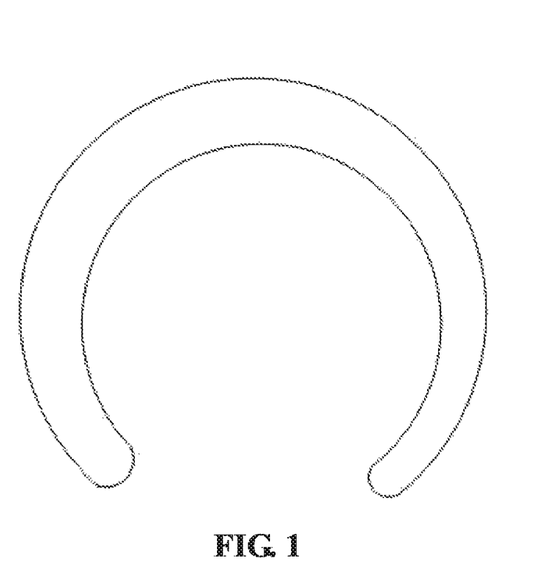
FIG. 1 is a schematic diagram showing a circular pattern displayed in a smart device having a system chip with a floating point unit (FPU) according to the prior art.
Figure 2:
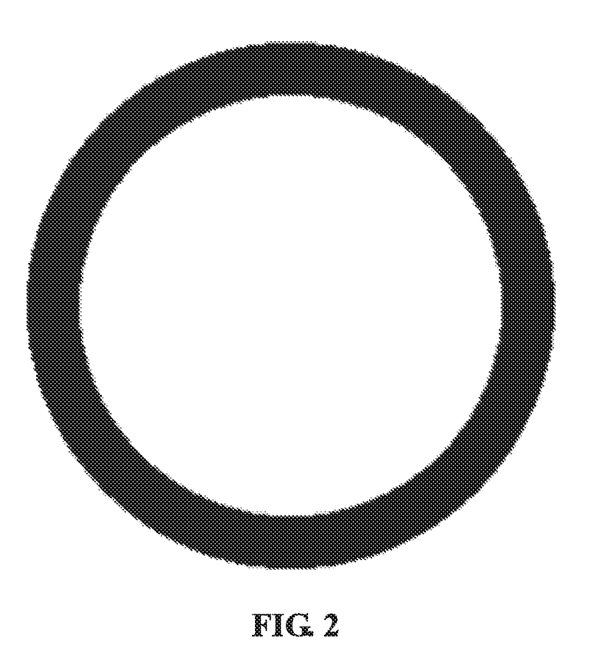
FIG. 2 is a schematic diagram showing a circular pattern displayed in a smart device having a system chip without the FPU according to the prior art.

Smart watch solutions on many hardware platforms are blossoming, with hot development of smart hardware. As shown in FIG. 1, a high performance chip A7 developed by APPLE can run floating point arithmetic well, and display circular patterns smoothly. Some low performance and low power chips also have advantages, but they are comparatively inborn deficient in displaying graphics, because the low power chips have no floating point unit (FPU) to support floating point arithmetic. So the low power chips cannot run complex graphical user interface (GUI) arithmetic, to display the circular patterns smoothly. As shown in FIG. 2, it leaves edges of the circular patterns to appear rough, which cannot meet the needs of users on pattern aesthetics.

Therefore, the prior art has to be improved and developed.

SUMMARY OF THE INVENTION

To overcome the above-mentioned disadvantages, an object of the present disclosure is to provide an optimizing method, a system, and a smart device to display circular patterns smoothly, which solves edges of the circular patterns not being displayed smoothly when the smart device is configured a low power chip inside.

The technical schemes of the present disclosure are illustrated hereunder.

An optimizing method to display circular patterns smoothly, includes:

acquiring a center coordinate of a circular pattern having a center and a radius;

getting coordinate values of all points on the circular pattern using the center coordinate of the circular pattern as an original point of a coordinate axis and using the radius of the circular pattern, and also acquiring transparency and red, green, and blue (RGB) parameters of all the points;

calculating respective transparency compensation values of two adjacent points with respect to a corresponding one of the points to any coordinate in an X-axis direction and a Y-axis direction of the circular pattern using a maximum limit of the transparency as a benchmark;

calculating a transparency compensation value of the corresponding one of the points using the transparency compensation values of the two adjacent points and using principle that the transparency gradually increases or decreases, and redrawing the corresponding point based on the calculated transparency compensation value and the RGB parameters of the corresponding one of the points, until all points of the circular pattern are redrawn successively.

In the optimizing method to display circular patterns smoothly, a calculation formula of the transparency compensation value of the corresponding point according to the transparency compensation values of the two adjacent points is:

$$tran=(dy-floor(dy))*maxtrans+0.5, \text{ in the } Y\text{-axis direction,}$$

$$tran=(dx-floor(dx))*maxtrans+0.5, \text{ in the } X\text{-axis direction;}$$

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

In the optimizing method to display graphics circular patterns smoothly, the circular pattern includes a circle, an arc, or a ring.

An optimizing method to display circular patterns smoothly, includes:

acquiring a center coordinate of a circular pattern, and getting coordinate values of all points on the circular pattern using the center coordinate and using the radius of the circular pattern, and also acquiring transparency and RGB parameters of all the points;

calculating respective transparency compensation values of two adjacent points with respect to a corresponding one of the points to any coordinate in an X-axis direction and a Y-axis direction of the circular pattern using a maximum limit of the transparency as a benchmark;

calculating a transparency compensation value of the corresponding one of the points using the transparency compensation values of the two adjacent points and using principle that the transparency gradually increases or decreases, and redrawing the corresponding point based on the calculated transparency compensation value and the RGB parameters of the corresponding one of the points, until all points of the circular pattern are redrawn successively.

In the optimizing method to display circular patterns smoothly, getting coordinate values of all points on the circular pattern according to the center coordinate and a radius of the circular pattern includes:

getting coordinate values of all points on the circular pattern using the center coordinate of the circular pattern as an original point of a coordinate axis and using the radius of the circular pattern.

In the optimizing method to display graphics patterns smoothly, a calculation formula of the transparency compensation value of the corresponding point according to the transparency compensation values of the two adjacent points is:

$$tran=(dy-floor(dy))*maxtrans\pm0.5, \text{ in the } Y\text{-axis direction,}$$

$$tran=(dx-floor(dx))*maxtrans\pm0.5, \text{ in the } X\text{-axis direction;}$$

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

In the optimizing method to display circular patterns smoothly, the circular pattern includes a circle, an arc, or a ring.

The optimizing method to display circular patterns smoothly, including:

a data acquiring module, acquiring a center coordinate of a circular pattern, and getting coordinate values of all points on the circular pattern using the center coordinate and using the radius of the circular pattern, and also acquiring transparency and RGB parameters of all the points;

an adjacent compensation calculating module, calculating respective transparency compensation values of two adjacent points with respect to a corresponding one of the points to any coordinate in an X-axis direction and a Y-axis direction of the circular pattern using a maximum limit of the transparency as a benchmark;

a point drawing module, calculating a transparency compensation value of the corresponding one of the points using the transparency compensation values of the two adjacent points and using principle that the transparency gradually increases or decreases, and redrawing the corresponding point based on the calculated transparency compensation value and the RGB parameters of the corresponding one of the points;

a point redrawing module, redrawing all points of the circular pattern successively.

In the optimizing system to display circular patterns smoothly, the data acquiring module includes:

a coordinate value calculating unit, getting coordinate values of all points on the circular pattern using the center coordinate of the circular pattern as an original point of a coordinate axis and using the radius of the circular pattern.

In the optimizing system to display circular patterns smoothly, a calculation formula of the transparency compensation value of the corresponding point according to the transparency compensation values of the two adjacent points is:

$$tran=(dy\text{-floor}(dy))*maxtrans+0.5, \text{ in the } Y\text{-axis direction,}$$

$$tran=(dx\text{-floor}(dx))*maxtrans+0.5, \text{ in the } X\text{-axis direction;}$$

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

In the optimizing system to display circular patterns smoothly, the circular pattern includes a circle, an arc, or a ring.

A smart device, including an optimizing system to display circular patterns smoothly, wherein the smart device is a cellphone, a tablet computer, or a wearable device.

Beneficial effects, the present disclosure provides the optimizing method, the system, and the smart device to display circular patterns smoothly. It gets coordinate values of all points on the circular pattern. And it calculates respective transparency compensation values of two adjacent points with respect to a corresponding one of the points to any coordinate in an X-axis direction and a Y-axis direction of the circular pattern using a maximum limit of the transparency as a benchmark, then calculates a transparency compensation value of the corresponding one of the points using the transparency compensation values of the two adjacent points. Finally, it redraws all points of the circular pattern based on the calculated transparency compensation value and the RGB parameters of the corresponding one of the points. The method and the system solve the problem of how to draw a smooth circular in a smart device without a FPU inside a micro-controller unit (MCU), and support the display performance for the low power chip. The method and system provided by the present disclosure, easy to implement, couple well to the platform functions, and improve the intelligent performance for the smart device having a low power chip.

DESCRIPTION OF SPECIFIC EMBODIMENTS OF THE INVENTION

In order to describe the purpose, the technical solution and the advantage of the present disclosure more clearly and definitely, the following drawing and description will further describe the present disclosure specifically. It should be understood that, the description of the embodiment here is only used for explaining the present disclosure, not limiting the present disclosure.

Figure 3:
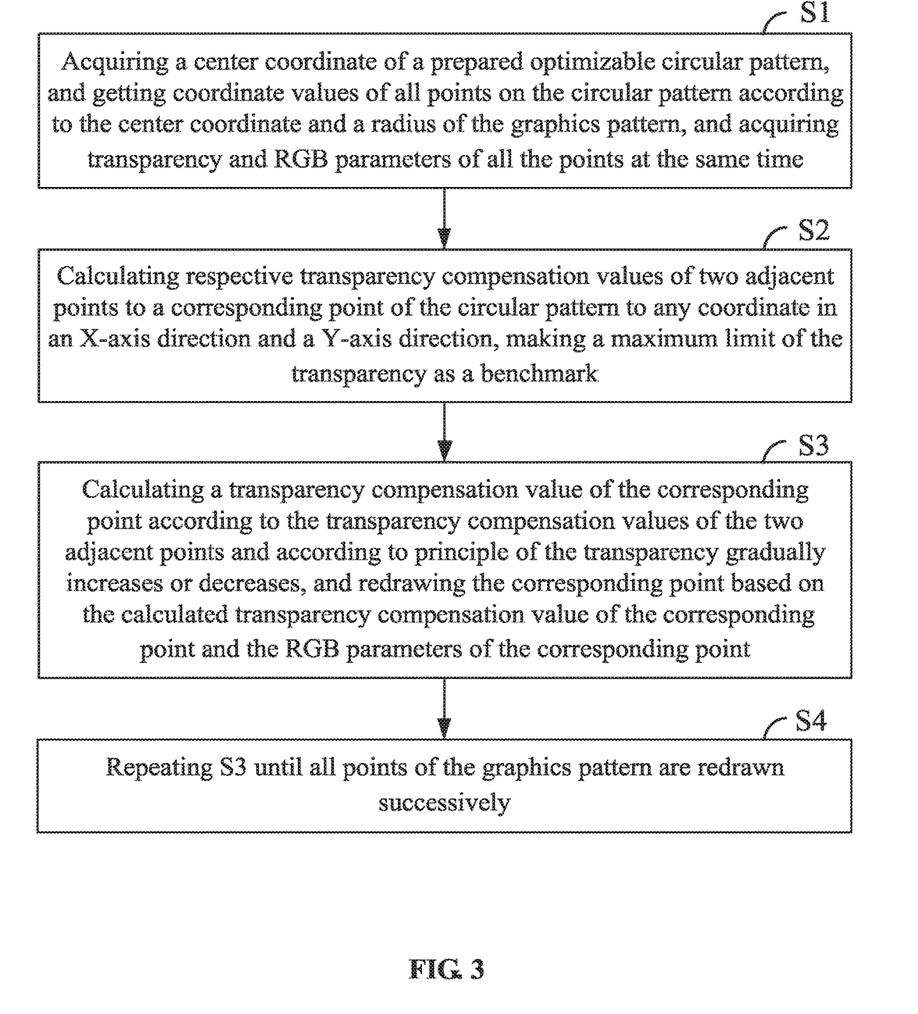
FIG. 3 is a schematic diagram showing an optimized circular pattern displayed in the smart device having the system chip without the FPU according to the present disclosure.

In order to solve the problem in the prior art that the circular patterns displayed unsmoothly because a smart device having a low power chip cannot run floating point arithmetic, an optimizing method to display circular patterns smoothly provided by the present disclosure, shown as FIG. 3, includes:

In step S1, acquiring a center coordinate of a circular pattern, and getting coordinate values of all points on the circular pattern using the center coordinate and using a radius of the circular pattern, and also acquiring transparency and red, green, and blue (RGB) parameters of all the points. The circular pattern includes a circle, an arc, or a ring.

In the method, first, acquiring a prepared optimizable circular pattern, locating the center coordinate of the circular pattern, and getting the coordinate values of all points on the circular pattern after acquiring the center coordinate and the radius of the circular pattern.

Specifically, the circular pattern may include a circle, an arc, or a ring. All of these patterns have a center and a radius, and an edge of the circular pattern is displayed unsmoothly in a smart device without a floating point unit (FPU) running floating point arithmetic.

In step S2, calculating respective transparency compensation values of two adjacent points with respect to a corresponding one of the points to any coordinate in an X-axis direction and a Y-axis direction of the circular pattern using a maximum limit of the transparency as a benchmark.

In order to display the circular pattern more smoothly, the present disclosure redraws points of the circular pattern through setting transparency levels. Specifically, the transparency of the points on the circular pattern gradually increases or decreases, which makes the points of the circular pattern seem gradients compared to a base image. Therefore, the whole circular pattern seems to be a smooth circular arc. For the mentioned effect, the above step first sets a transparency compensation standard, that is, to calculate transparency for each point on the circular pattern and calculate transparency compensation values for the each point, using a maximum limit of the transparency as a benchmark.

Specifically, the embodiment may acquire respective transparency compensation values of a corresponding one of the points to any coordinate in an X-axis direction and a Y-axis direction, and calculate the transparency compensation values.

In step S3, calculating a transparency compensation value of the corresponding one of the points using the transparency compensation values of the two adjacent points and using principle that the transparency gradually increases or decreases, and redrawing the corresponding point based on the calculated transparency compensation value and the RGB parameters of the corresponding one of the points.

When the transparency compensation value of each point is calculated, the transparency compensation value of two adjacent points should be considered, because the transparency gradually increases or decreases. The transparency of the corresponding point compensates according to the two adjacent transparency compensation values. Specifically, each pixel point has four components A, R, G, and B, using a graduated neutral density filter (GND) principle. It acquires the transparency of left and right adjacent points through arithmetic, to make a smooth transition to a benchmark coordinate point, to avoid sawtooth display in the circular pattern.

In this step, a calculation formula of the transparency compensation value of the corresponding point using the transparency compensation values of the two adjacent points is:

$$\text{tran}=(dy-\text{floor}(dy))*\text{maxtrans}\pm 0.5, \text{ in the } Y\text{-axis direction,}$$

$$\text{tran}=(dx-\text{floor}(dx))*\text{maxtrans}\pm 0.5, \text{ in the } X\text{-axis direction;}$$

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

In step S4, repeating S3 until all points of the circular pattern are redrawn successively.

The optimizing method to display the circular pattern smoothly, through above mentioned steps S1 to S4, displays the same as the effect as FIG. 1 after the floating point arithmetic with a high performance.

The step S1 further includes:

In step S11, getting coordinate values of all points on the circular pattern using the center coordinate of the circular pattern as an original point of a coordinate axis and using the radius of the circular pattern.

In order to calculate the transparency compensation values conveniently, in the embodiment, the located center coordinate of the circular pattern is chosen to be the original point of the coordinate axis, which simplifies calculating the coordinate values of all points on the circular pattern, and improves chip processing data efficiency.

The following steps, in the embodiment, combined with algorithm program to optimize the circular pattern further illustrate the method of the present disclosure. The algorithm program to optimize the circular pattern is as follows:

```
void gdi_draw_anti_circle(S32x, S32y, S32 radius, gdi_color circle_color)
{
    S32 quarter = (S32)(0.707 * radius + 0.5);
    S32 i;
    double dx, dy;
    double delt;
    U32 tran;
    U32 alpha, alpha2;
    U32 maxTrans = 0xFF;
    kal_uint32 a, r, g, b;
    for (i = 0; i <= quarter; ++i)
    {
        double temp = sqrt(1 - ((i * i * 1.0f) / (radius * radius)));
        dy = radius * temp;
        delt = dy - floor(dy);
        tran = (U32)(delt * maxTrans + 0.5);
        gdi_cf_separate_color(GDI _COLOR_FORMAT_32, circle_color, &a, &r, &g, &b);
        alpha = gdi_cf_get_color(GDI_COLOR_FORMAT_32, tran, r, g, b);
        alpha2 = gdi_cf_get_color(GDI_COLOR_FORMAT_32, (maxTrans − tran), r, g, b);
        gdi_draw_pixel4(x, y, i, floor(dy), alpha2);
        gdi_draw_pixel4(x, y, i, floor(dy) +1, alpha);
    }
    for (i = 0; i <= quarter; ++i)
    {
        dx = radius * sqrt(1 − (i * i * 1.0f) / (radius * radius));
        delt = dx − floor(dx);
        tran = (U32)(delt * maxTrans + 0.5);
        gdi_cf_separate_color(GDI_COLOR_FORMAT_32, circle_color, &a, &r, &g, &b);
```

```
    alpha = gdi_cf_get_color(GDI_COLOR_FORMAT_32, tran, r, g, b);
    alpha2 = gdi_cf_get_color(GDI_COLOR_FORMAT_32, (maxTrans – tran), r, g,
b);
    gdi_draw_pixel4(x, y, floor(dx), i, alpha2);
    gdi_draw_pixel4(x, y, floor(dx) + 1, i, alpha);
    }
  }
```

Figure 4:
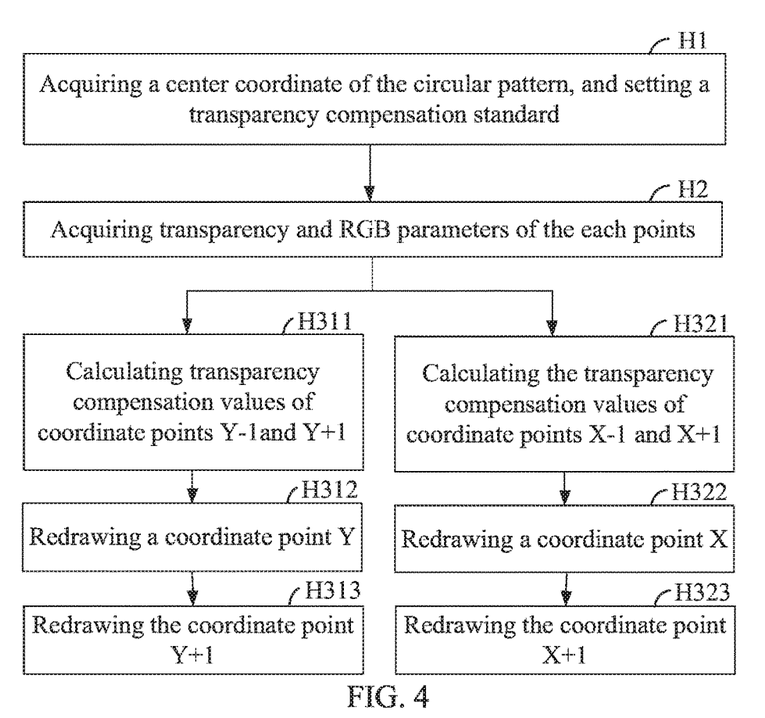
FIG. 4 is a flowchart of an embodiment of the method according to the present disclosure.

As shown in FIG. 4, the above algorithm program includes the main step as follows:

In step H1, first acquiring a center coordinate of a circular pattern, and setting a transparency compensation standard. That is, setting a maximum limit of the transparency to be 255.

In step H2, acquiring transparency and RGB parameters of each point using a center coordinate and a radius.

In step H311, calculating transparency compensation values of an adjacent point before and an adjacent point after a corresponding point of the pattern, in a Y-axis direction. That is, when the corresponding point is Y, calculating the transparency compensation values of coordinate points Y−1 and Y+1, where the calculation formula of the compensation value is: tran=(dy-floor(dy))*maxtrans±0.5.

In step H321, calculating transparency compensation values of an adjacent point before and an adjacent point after a corresponding point of the pattern, in an X-axis direction. That is, when the corresponding point is X, calculating the transparency compensation values of coordinate points X−1 and X+1, where the calculation formula of the compensation value is: tran=(dx-floor(dx))*maxtrans±0.5.

The "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

In step H312, calculating a transparency compensation value of a corresponding point Y with respect to the transparency compensation values of the two adjacent points, and redrawing the coordinate point Y.

In step H322, calculating a transparency compensation value of a corresponding point X with respect to the transparency compensation values of the two adjacent points, and redrawing the coordinate point Y.

In step H313, redrawing the coordinate point Y+1, using the same method.

In step H323, redrawing the coordinate point X+1 using the same method.

The above mentioned method for the smart device without FPU, such as a smart watch, keeps cost down and ensures GUI display effect meanwhile, and brings more competitive for products. The important features of the software further includes achieving the smooth circle by pure C codes, and improving portability and reduces coupling to the function platform by independent application programming interface (API) packing function. The important features of the software further include an independent algorithm achieving a well optimization.

Figure 5:
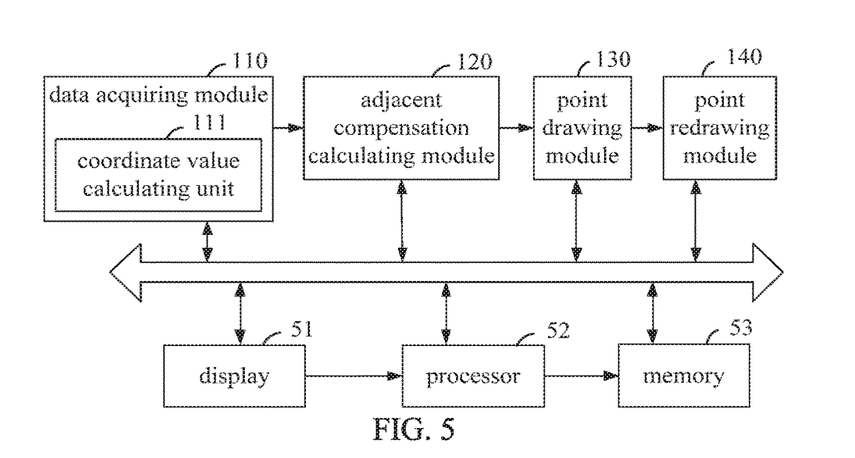
FIG. 5 is a principle structure diagram showing an optimizing system to display circular patterns smoothly.

On the premise of the above method, the present disclosure further provides an optimizing system to display circular patterns smoothly, which may be some kind of terminal device. As shown in FIG. 5, the optimizing system to display circular patterns smoothly includes a display 51, a processor 52, a memory 53, and some modules. The modules are stored in the memory 53, executed by the processor 52, and output to the display 51, and the modules are as follows:

A data acquiring module 110 acquires a center coordinate of a circular pattern, and gets coordinate values of all points on the circular pattern using the center coordinate and using the radius of the circular pattern, and also acquires transparency and RGB parameters of all the points.

An adjacent compensation calculating module 120 calculates respective transparency compensation values of two adjacent points with respect to a corresponding one of the points to any coordinate in an X-axis direction and a Y-axis direction of the circular pattern using a maximum limit of the transparency as a benchmark.

A point drawing module 130 calculates a transparency compensation value of the corresponding one of the points using the transparency compensation values of the two adjacent points and using principle that the transparency gradually increases or decreases, and redraws the corresponding point based on the calculated transparency compensation value and the RGB parameters of the corresponding one of the points.

A point redrawing module 140 redraws all points of the circular pattern successively.

The data acquiring module 110 includes:

A coordinate value calculating unit 111 gets the coordinate values of all points on the circular pattern using the center coordinate of the circular pattern as an original point of a coordinate axis and using the radius of the circular pattern.

A calculation formula of the transparency compensation value of the corresponding point using the transparency compensation values of the two adjacent points is:

$$tran=(dy\text{-floor}(dy))*maxtrans\pm0.5, \text{ in the } Y\text{-axis direction,}$$

$$tran=(dx\text{-floor}(dx))*maxtrans\pm0.5, \text{ in the } X\text{-axis direction;}$$

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

In the optimizing system to display circular patterns smoothly, the circular pattern includes a circle, an arc, or a ring.

Based on the optimizing system to display circular patterns smoothly, the present disclosure further discloses a smart device including the optimizing system to display circular patterns smoothly. The smart device is a cellphone, a tablet computer, or a wearable device.

The present disclosure provides the optimizing method, the system, and the smart device to display circular patterns smoothly. It gets coordinate values of all points on the circular pattern. It calculates respective transparency compensation values of two adjacent points with respect to a corresponding one of the points to any coordinate in an X-axis direction and a Y-axis direction of the circular pattern using a maximum limit of the transparency as a benchmark, and then calculates a transparency compensation value of the corresponding one of the points using the transparency compensation values of the two adjacent points. Finally, it redraws all points of the circular pattern based on the calculated transparency compensation value and the RGB parameters of the corresponding one of the points. The method and the system solve the problem of how to draw a smooth circular in a smart device without a FPU inside a micro-controller unit (MCU), and support the display performance for the low power chip. The method and system provided by the present disclosure, easy to implement, couple well to the platform functions, and improve the intelligent performance for the smart device having a low power chip.

It should be understood for a person having ordinary skill in the art, all or part of the method is implemented by computer program instructions related to hardware. The program may be stored in a computer readable storage medium. When the program is executed, including the flow in the embodiment of the present invention. Among them, the storage medium may be disk, CD, read-only memory, or random storage memory, etc.

What is claimed is:

1. An optimizing method to display circular patterns smoothly, comprising:

acquiring a center coordinate of a circular pattern having a center and a radius;

getting coordinate values of all points on the circular pattern using the center coordinate of the circular pattern as an original point of a coordinate axis and using the radius of the circular pattern, and acquiring transparency and red, green, and blue (RGB) parameters of all the points;

calculating respective transparency compensation values of two adjacent points with respect to a corresponding one of the points to any coordinate in an X-axis direction and a Y-axis direction of the circular pattern using a maximum limit of the transparency as a benchmark; and calculating a transparency compensation value of the corresponding one of the points using the transparency compensation values of the two adjacent points and using principle that the transparency gradually increases or decreases, and redrawing the corresponding point based on the calculated transparency compensation value and the RGB parameters of the corresponding one of the points, until all points of the circular pattern are redrawn successively;

wherein a calculation formula of the transparency compensation value of the corresponding point using the transparency compensation values of the two adjacent points is:

$tran=(dy-\text{floor}(dy))*maxtrans+0.5$, in the Y-axis direction, $tran=(dx-\text{floor}(dx))*maxtrans+0.5$, in the X-axis direction;

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

2. The optimizing method to display the circular patterns smoothly as claimed in claim 1, wherein the circular pattern comprises a circle, an arc, or a ring.

3. The optimizing method to display the circular patterns smoothly as claimed in claim 1, wherein the circular pattern comprises a circle, an arc, or a ring.

4. An optimizing method to display circular patterns smoothly, comprising:

acquiring a center coordinate of a circular pattern, and getting coordinate values of all points on the circular pattern using the center coordinate and using a radius of the circular pattern, and acquiring transparency and red, green, and blue (RGB) parameters of all the points;

calculating respective transparency compensation values of two adjacent points with respect to a corresponding one of the points to any coordinate in an X-axis direction and a Y-axis direction of the circular pattern using a maximum limit of the transparency as a benchmark; and calculating a transparency compensation value of the corresponding one of the points using the transparency compensation values of the two adjacent points and using principle that the transparency gradually increases or decreases, and redrawing the corresponding point based on the calculated transparency compensation value and the RGB parameters of the corresponding one of the points, until all points of the circular pattern are redrawn successively;

wherein a calculation formula of the transparency compensation value of the corresponding one of the points using the transparency compensation values of the two adjacent points is:

$tran=(dy-\text{floor}(dy))*maxtrans+0.5$, in the Y-axis direction, $tran=(dx-\text{floor}(dx))*maxtrans+0.5$, in the X-axis direction;

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

5. The optimizing method to display the circular patterns smoothly as claimed in claim 4, wherein getting coordinate values of all points on the circular pattern using the center coordinate and using the radius of the circular pattern, comprises:

getting the coordinate values of all points on the circular pattern using the center coordinate of the circular pattern as an original point of a coordinate axis and using the radius of the circular pattern.

6. The optimizing method to display the circular patterns smoothly as claimed in claim 5, wherein the circular pattern comprises a circle, an arc, or a ring.

7. The optimizing method to display the circular patterns smoothly as claimed in claim 4, wherein the circular pattern comprises a circle, an arc, or a ring.

8. The optimizing method to display the circular patterns smoothly as claimed in claim 4, wherein the circular pattern comprises a circle, an arc, or a ring.

9. An optimizing system to display circular patterns smoothly, comprising:

a memory storing computerized instructions; and
a processor executing the computerized instructions to perform steps comprising:
acquiring a center coordinate of a circular pattern, and getting coordinate values of all points on the circular pattern using the center coordinate and using a radius of the circular pattern, and acquiring transparency and red, green, and blue (RGB) parameters of all the points;
calculating respective transparency compensation values of two adjacent points with respect to a corresponding one of the points to any coordinate in an X-axis direction and a Y-axis direction of the circular pattern using a maximum limit of the transparency as a benchmark;
calculating a transparency compensation value of the corresponding one of the points using the transparency compensation values of the two adjacent points and using principle that the transparency gradually increases or decreases, and redrawing the corresponding point based on the calculated transparency compensation value and the RGB parameters of the corresponding one of the points;
redrawing all points of the circular pattern successively;
wherein a calculation formula of the transparency compensation value of the corresponding one of the points using the transparency compensation values of the two adjacent points is:

$$\text{tran}=(dy\text{-floor}(dy))*\text{maxtrans}+0.5, \text{ in the } Y\text{-axis direction,}$$

$$\text{tran}=(dx\text{-floor}(dx))*\text{maxtrans}+0.5, \text{ in the } X\text{-axis direction;}$$

where "tran" is a transparency compensation value, "dy" and "dx" are a Y coordinate value and an X coordinate value of the point, "floor(dy)" and "floor(dx)" indicate integers, which are obtained by substituted dy and dx into a floor function respectively, and no greater than dy and dx, "maxtrans" is the maximum limit of the transparency.

10. The optimizing system to display the circular patterns smoothly as claimed in claim 9, wherein the processor further executes the computerized instructions to perform a step of:

getting the coordinate values of all points on the circular pattern using the center coordinate of the circular pattern as an original point of a coordinate axis and using the radius of the circular pattern.

11. The optimizing system to display the circular patterns smoothly as claimed in claim 10, wherein the circular pattern comprises a circle, an arc, or a ring.

12. The optimizing system to display the circular patterns smoothly as claimed in claim 9, wherein the circular pattern comprises a circle, an arc, or ring.

13. The optimizing system to display the circular patterns smoothly as claimed in claim 9, wherein the circular pattern comprises a circle, an arc, or a ring.

* * * * *

UNITED STATES PATENT AND TRADEMARK OFFICE
CERTIFICATE OF CORRECTION

PATENT NO. : 10,438,324 B2  
APPLICATION NO. : 15/546805  
DATED : October 8, 2019  
INVENTOR(S) : Libin Zhou Page 1 of 1

It is certified that error appears in the above-identified patent and that said Letters Patent is hereby corrected as shown below:

On the Title Page

In the Title section, item (54), Line 1 and in the Specification, Column 1, Line 1:
"OPTIMIZATING" should be changed to -- OPTIMIZING --

Signed and Sealed this
Seventeenth Day of December, 2019

Andrei Iancu
*Director of the United States Patent and Trademark Office*